(12) United States Patent
Guo et al.

(10) Patent No.: US 12,617,304 B2
(45) Date of Patent: May 5, 2026

(54) INTEGRATED CONTROLLER, ELECTRIC DRIVE ASSEMBLY, AND VEHICLE

(71) Applicant: BYD COMPANY LIMITED, Shenzhen (CN)

(72) Inventors: Caifang Guo, Shenzhen (CN); Axi Qi, Shenzhen (CN); Jian Liu, Shenzhen (CN); Jian Gao, Shenzhen (CN); Lele Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 28 days.

(21) Appl. No.: 18/524,205

(22) Filed: Nov. 30, 2023

(65) Prior Publication Data

US 2024/0092201 A1 Mar. 21, 2024

Related U.S. Application Data

(63) Continuation of application No. PCT/CN2022/099423, filed on Jun. 17, 2022.

(30) Foreign Application Priority Data

Aug. 4, 2021 (CN) .......................... 202110889134.3

(51) Int. Cl.
*B60L 53/22* (2019.01)

(52) U.S. Cl.
CPC ........... *B60L 53/22* (2019.02); *B60L 2210/10* (2013.01)

(58) Field of Classification Search
None
See application file for complete search history.

(56) References Cited

U.S. PATENT DOCUMENTS

| | | | |
|---|---|---|---|
| 2010/0130033 A1* | 5/2010 | Lee ..................... | B60R 16/0238 |
| | | | 439/76.2 |
| 2015/0006008 A1 | 1/2015 | Wei et al. | |
| 2018/0083509 A1* | 3/2018 | Yang ................... | H01M 10/625 |
| 2019/0067973 A1* | 2/2019 | Yamada ................. | B60L 53/16 |
| 2019/0270417 A1* | 9/2019 | Spesser ................ | B60L 3/0007 |

(Continued)

FOREIGN PATENT DOCUMENTS

| | | |
|---|---|---|
| CN | 204184209 U | 3/2015 |
| CN | 205256048 U | 5/2016 |

(Continued)

OTHER PUBLICATIONS

International Search Report and Written Opinion for Application No. PCT/CN2022/099423, mailed on Sep. 2, 2022, 15 pages.

(Continued)

*Primary Examiner* — Rexford N Barnie
*Assistant Examiner* — Aqeel H Bukhari
(74) *Attorney, Agent, or Firm* — Sheppard Mullin Richter & Hampton LLP

(57) ABSTRACT

An integrated controller includes: a box; a controller and a charging/discharging converter disposed in the box; and a high-voltage interface assembly including a high-voltage interface disposed on the box and a high-voltage connector disposed in the box. The high-voltage connector is connected with the high-voltage interface, the controller, and the charging/discharging converter to receive and distribute a high-voltage battery signal.

17 Claims, 4 Drawing Sheets

(56)                References Cited

U.S. PATENT DOCUMENTS

| | | | | |
|---|---|---|---|---|
| 2020/0122584 A1* | 4/2020 | Zhang | .................. | B60W 10/30 |
| 2020/0171960 A1 | 6/2020 | Robbins et al. | | |
| 2021/0354592 A1* | 11/2021 | Zuo | .................... | H01M 10/615 |
| 2023/0395890 A1* | 12/2023 | Zhao | .................. | H01M 10/637 |
| 2024/0178690 A1* | 5/2024 | Huang | ................... | H02J 7/007 |

FOREIGN PATENT DOCUMENTS

| | | | |
|---|---|---|---|
| CN | 107128159 | A | 9/2017 |
| CN | 107640061 | A | 1/2018 |
| CN | 206953969 | U | 2/2018 |
| CN | 110091814 | A | 8/2019 |
| CN | 209351255 | U | 9/2019 |
| CN | 110549872 | A | 12/2019 |
| CN | 210970721 | U | 7/2020 |
| CN | 112092680 | A | 12/2020 |
| CN | 112389267 | A | 2/2021 |
| CN | 213007972 | U | 4/2021 |
| CN | 112977002 | A | 6/2021 |
| CN | 113022326 | A | 6/2021 |
| JP | 2012-165526 | A | 8/2012 |
| JP | 2016-193651 | A | 11/2016 |
| JP | 2016-220343 | A | 12/2016 |
| JP | 2020-150745 | A | 9/2020 |
| KR | 10-2019-0049413 | A | 5/2019 |
| WO | 2022068828 | A1 | 4/2022 |

OTHER PUBLICATIONS

Request for the Submission of an Opinion dated Mar. 17, 2025, issued in related Korean Patent Application No. 10-2023-7041733, with English machine translation (18 pages).

Examination Report dated Nov. 20, 2024, issued in related Australian Patent Application No. 2022322688 (3 pages).

Office Action dated Jan. 30, 2025, issued in related Canadian Patent Application No. 3,224,326 (5 pages).

Office Action dated Jul. 2, 2025, issued in related Canadian Patent Application No. 3,224,326 (4 pages).

Notice of Reasons for Refusal dated Jan. 14, 2025, issued in related Japanese Patent Application No. 2023-572063, with English machine translation (12 pages).

Extended European Search Report dated Sep. 16, 2024, issued in related European Patent Application No. 22851734.8 (10 pages).

First Office Action and Search Report dated Jan. 23, 2025, issued in related Chinese Patent Application No. 202110889134.3, with English machine translation (15 pages).

* cited by examiner

1

5

Second digital signal processing chip — 12

Third digital signal processing chip — 13

Power network CAN

AC charging CC

Collision signal

Bus voltage sampling

Water temperature sampling

Bus voltage sampling value

Core 0 MCU

First digital signal processing chip

Core 1 VCU+BMC+PDU — 11

1

5

Second power unit — 7

12V

Inlet filter unit — 8

First power unit — 6

INTEGRATED CONTROLLER, ELECTRIC DRIVE ASSEMBLY, AND VEHICLE

CROSS-REFERENCE TO RELATED APPLICATIONS

This application is a Continuation Application of International Patent Application No. PCT/CN2022/099423, filed on Jun. 17, 2022, which is based on and claims priority to and benefits of Chinese Patent Application No. 202110889134.3, filed on Aug. 4, 2021. The entire content of all of the above-referenced applications is incorporated herein by reference.

FIELD

The present disclosure relates to the field of vehicle technologies, and more particularly, to an integrated controller, an electric drive assembly, and a vehicle.

BACKGROUND

In the related art, an electric drive assembly has multiple integration manners, for example, a motor controller and a DC/DC converter are integrated into one piece, or a motor, a motor controller, and a speed reducer are integrated into one piece, or a DC/DC converter, an on-board controller (OBC), and a power distribution unit (PDU) are integrated into one piece, to save costs in a wiring harness, a support, and the like. However, the above integration is a physical integration solution, where different modules are assembled, and there is less reuse parts of the elements.

For example, an integration may include the "power three-in-one" integration manner of a motor, a motor controller, and a speed reducer. The integration needs a signal wiring harness between the integrated "power three-in-one" and a vehicle control unit (VCU), a high-voltage wiring harness between the integrated "power three-in-one" and the PDU, a high-voltage wiring harness between the PDU and each of the DC/DC and the OBC, a signal wiring harness for interaction among the DC, the OBC, and the vehicle, and housings and module fixing supports of these modules. In such an integration, the costs are high, and a layout of components occupies a large space of the vehicle, and a signal interaction transmission speed is slow.

SUMMARY

The present disclosure resolves at least one of the technical problems existing in the related art. In view of the above, a first aspect of the present disclosure provides an integrated controller. The integrated controller may eliminate arrangement of a high-voltage distribution box, which reduces a demand for a high-voltage wiring harness, reduces costs, and saves vehicle space.

A second aspect of the present disclosure provides an electric drive assembly.

A third aspect of the present disclosure provides a vehicle.

An embodiment of a first aspect of the present disclosure provides an integrated controller, which includes: a box; a controller and a charging/discharging converter disposed in the box; and a high-voltage interface assembly, including a high-voltage interface disposed on the box and a high-voltage connector disposed in the box, the high-voltage connector connected with the high-voltage interface, the controller, and the charging/discharging converter to receive and distribute a high-voltage battery signal.

According to the integrated controller in an embodiment of the present disclosure, the control unit or controller and the charging/discharging conversion unit or charging/discharging converter are disposed in the same box, which reduces use of structural parts and saves costs. In addition, the high-voltage interface assembly is configured to be connected to the control unit and the charging/discharging conversion unit, which may reduce the demand for high-voltage connection members and high-voltage wiring harnesses, and cancel the arrangement of the high-voltage distribution box, save space, and reduce costs.

In some embodiments, the control unit includes a motor controller, a vehicle controller, and a battery management controller; and the charging/discharging converter comprises a direct current (DC) converter and an on-board charger.

In some embodiments, the high-voltage interface assembly includes a first high-voltage interface, a second high-voltage interface, and a third high-voltage interface disposed on the box, a first connector, a second connector, a third connector, and a fourth connector. The first high-voltage interface is configured to receive the high-voltage battery signal. The first connector is connected with the first high-voltage interface and the second high-voltage interface; the second connector is connected with the DC converter and the on-board charger; the third connector is connected with the motor controller; and the fourth connector is connected with the first high-voltage interface and the third high-voltage interface.

In some embodiments, the integrated controller further includes: a low-voltage connector disposed in the box, and connected with the controller and the charging/discharging converter to receive a low-voltage power signal and a transmission communication signal.

In some embodiments, the motor controller, the vehicle controller, and the battery management controller are integrated in a first digital signal processing chip; the DC converter is disposed on a second digital signal processing chip; and the on-board charger is disposed on a third digital signal processing chip.

In some embodiments, the integrated controller further includes: a first power unit, connected with the first digital signal processing chip to convert the low-voltage power signal into a power supply signal provided to the first digital signal processing chip; and a second power unit, connected with the second digital signal processing chip and the third digital signal processing chip to convert the low-voltage power signal into a power supply signal provided to the second digital signal processing chip and the third digital signal processing chip.

In some embodiments, the integrated controller further includes: an inlet filter connected with the low-voltage connector, the first power unit, and the second power unit to filter the low-voltage power signal.

A second aspect of the present disclosure provides an electric drive assembly, which includes: the integrated controller according to the above embodiment, configured to send a heating control signal in response to a heating demand of a vehicle; and a motor and a motor driver, the motor driver connected with the integrated controller and the motor to drive the motor to generate heat in response to the heating control signal.

According to the electric drive assembly in the embodiment of the present disclosure, the motor drive module or a motor driver is controlled by the motor controller through the integrated controller, and the function of heating the battery in a low temperature environment can be realized by using heating while traveling and locked-rotor heating. The heating module or a heater is not required to separately design for heating the battery, and costs of the vehicle are further saved.

In some embodiments, the electric drive assembly further includes a speed reducer, and the speed reducer is connected with the integrated controller.

A third aspect of the present disclosure provides a vehicle. The vehicle includes a power battery and the integrated controller according to the above embodiment. The power battery is connected with the integrated controller. In some embodiment, the vehicle includes a power battery and the electric drive assembly according to the above embodiment.

According to the vehicle in the embodiment of the present disclosure, by using the integrated controller or the electric drive assembly provided by the embodiment, the vehicle integration and the reuse degree can be improved, costs of the vehicle can be reduced, and the vehicle space can be saved.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and easy to understand in the description of the embodiments made with reference to the following accompanying drawings.

DETAILED DESCRIPTION

The embodiments of the present invention are described in detail below, and the embodiments described with reference to accompanying drawings are some examples.

In order to resolve the above problem, an embodiment of a first aspect of the present disclosure provides an integrated controller. The integrated controller may cancel arrangement of a high-voltage distribution box, which reduces a demand for a high-voltage wiring harness, reduces costs, and saves vehicle space.

An integrated controller according to the embodiments of the present disclosure is described below with reference to FIG. 1 to FIG. 4.

Figure 1:
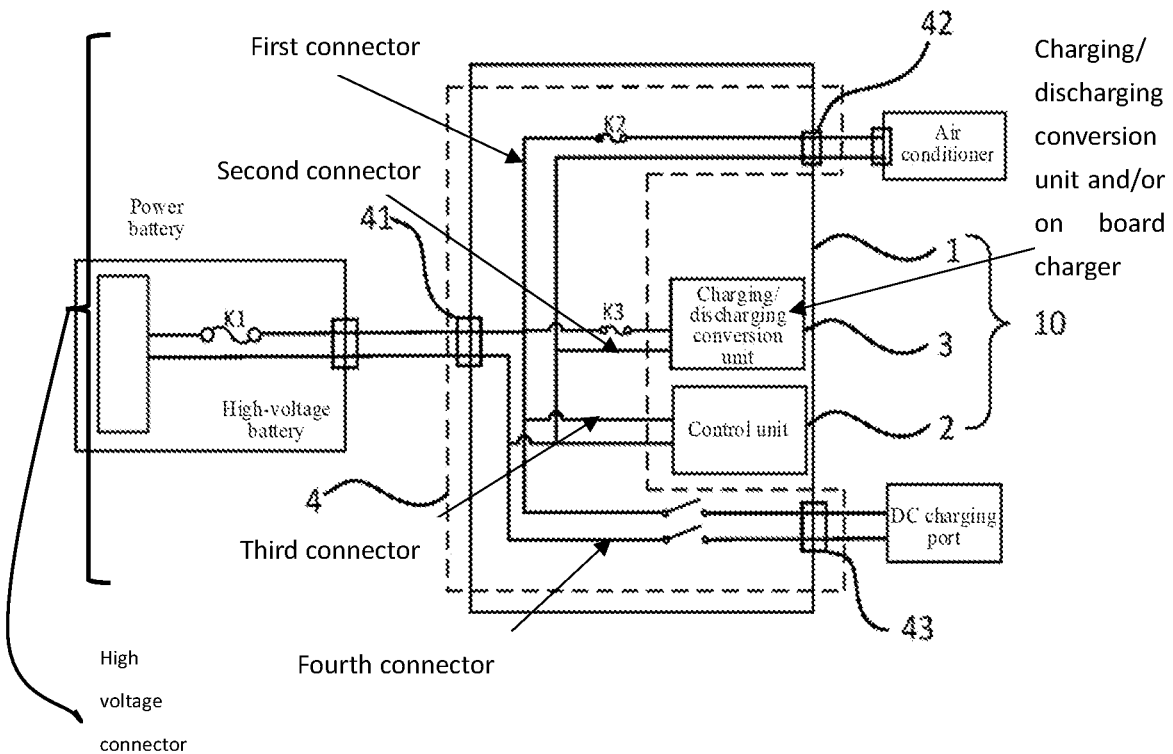
FIG. 1 is a schematic structural diagram of an integrated controller according to an embodiment of the present disclosure.

As shown in FIG. 1, the integrated controller 10 includes a box 1, a control unit 2 (e.g., a controller), a charging/ discharging conversion unit 3 (e.g., a charging/discharging converter), and a high-voltage interface assembly 4.

The control unit 2 and the charging/discharging conversion unit 3 are arranged/disposed in the box 1. That is to say, the control unit 2 and the charging/discharging conversion unit 3 use the same box 1, so that use of the box may be reduced in structure, degree of integration may be improved, occupied space may be saved, and costs may be reduced.

The high-voltage interface assembly 4 includes a high-voltage interface arranged on the box 1 and a high-voltage connection member (e.g., a high-voltage connector) arranged in the box 1. The high-voltage connection member is connected with the high-voltage interface, the control unit 2, and the charging/discharging conversion unit 3 to receive and distribute a high-voltage battery signal (e.g., a voltage no less than 60V). In an embodiment, a high-voltage distribution box exists for an original high-voltage power distribution design of the vehicle. A high-voltage power requires to enter the high-voltage distribution box through the high-voltage interface. The high-voltage distribution box divides the high-voltage power into multiple branches, each of which is outputted by a different high-voltage interface after passing through a different safety and contactor, thereby completing high-voltage power distribution for another module outside the high-voltage distribution box. Different from the original high-voltage power distribution design of the vehicle, the embodiment of the present disclosure is provided with a high-voltage interface assembly 4, and the control unit 2 and the charging/discharging conversion unit 3 are arranged in the box 1, and are all connected to the high-voltage connection member arranged in the box 1. Therefore, a high-voltage wiring harness connected to the control unit 2 and the charging/discharging conversion unit 3 share the same box 1 the control unit 2 and the charging/ discharging conversion unit 3. That is to say, in the embodiment of the present disclosure, a part of the high-voltage distribution box that distributes power to the high-voltage power in the original high-voltage power distribution design of the vehicle, that is, the high-voltage connection member, and another module outside the high-voltage distribution box, that is, the control unit 2 and the charging/discharging conversion unit 3 are partially recombined to be integrated and placed in the box 1. With this design, the arrangement of the high-voltage distribution box may be canceled, space may be saved, and the corresponding high-voltage interface for high-voltage power distribution between the control unit 2 and the charging/discharging conversion unit 3 does not need to be designed, the demand for high-voltage connection members and high-voltage wiring harnesses may be reduced, and the costs may be reduced.

According to the integrated controller 10 in an embodiment of the present disclosure, the control unit 2 and the charging/discharging conversion unit 3 are provided with the same box 1, which reduces use of structural parts and saves costs. In addition, the high-voltage interface assembly 4 is configured to be connected to the control unit 2 and the charging/discharging conversion unit 3, which may reduce the demand for high-voltage connection members and high-voltage wiring harnesses, and cancel the arrangement of the high-voltage distribution box, save space, and reduce costs.

In some embodiments, the control unit 2 includes a motor controller, a vehicle controller, and a battery management controller. In other words, the motor controller, the vehicle controller, and the battery management controller are highly integrated, which may not only reduce volume of the assembly, reduce demand for signal wiring harness, but also shorten interaction time and improve efficiency. In addition, the charging/discharging conversion unit 3 includes a direct current (DC) conversion unit (e.g., a DC converter) and a vehicle-mounted charging unit (e.g., a vehicle-mounted charger) and an on-board charging unit (e.g., an on-board charger). In other words, the DC conversion unit and the on-board charging unit are integrated to reduce an assembly volume and improve a degree of integration. Therefore, the above integration manner is also conducive to reuse a subsequent structure or module, and improve a reuse degree of the integrated controller 10.

In some embodiments, as shown in FIG. 1, the high-voltage interface assembly 4 includes a first high-voltage interface 41, a second high-voltage interface 42, and a third high-voltage interface 43 arranged on the box, and a first connection member (e.g., a first connector), a second connection member (e.g., a second connector), a third connection member (e.g., a third connector), and a fourth connection member (e.g., a fourth connector).

The first high-voltage interface 41 is configured to receive the high-voltage battery signal. The first connection member is connected with the first high-voltage interface 41 and the second high-voltage interface 42. The second connection member is connected with the DC conversion unit and the on-board charging unit. The third connection member is connected with the motor controller. The fourth connection member is connected with the first high-voltage interface 41 and the third high-voltage interface 43.

In an embodiment, different from the original high-voltage power distribution design of the vehicle, the embodiment of the present disclosure divides the relevant parts in the original high-voltage distribution box into two. As shown in FIG. 1, a part of the high-voltage distribution box is arranged in a high-voltage battery of the vehicle and connected to the power battery, and the other part is connected to the control unit 2 and the charging/discharging conversion unit 3 and placed in the box 1. As a result, during high-voltage power distribution, the high-voltage power, that is, the high-voltage battery signal, is outputted through the high-voltage interface of a fuse K1 and a high-voltage battery terminal, and is conveyed to the first high-voltage interface 41 by the connected high-voltage wiring harness. The first high-voltage interface 41 divides the high-voltage battery signal into four. In other words, the high-voltage power is distributed to the motor controller of the control unit 2, and the DC conversion unit and the on-board charging unit in the box 1 are distributed to the high-voltage power through a fuse K3, and are outputted to the second high-voltage interface 42 through a fuse K2. The high-voltage wiring harness distributes power to an air conditioner outside the box 1 through the high-voltage interface at an air conditioner terminal, and controls output to the third high-voltage interface 43 through the positive and negative contactors to distribute power to the DC charging port outside the box 1. Therefore, through the above all-in-one integrated design, the embodiment of the present disclosure cancels arrangement of the high-voltage distribution box, and reduces use of the high-voltage interface and the high-voltage wiring harness when the control unit 2 and the charging/discharging conversion unit 3 perform high-voltage power distribution, which shortens length of the wiring harness between different modules, and saves costs and space.

Figure 2:
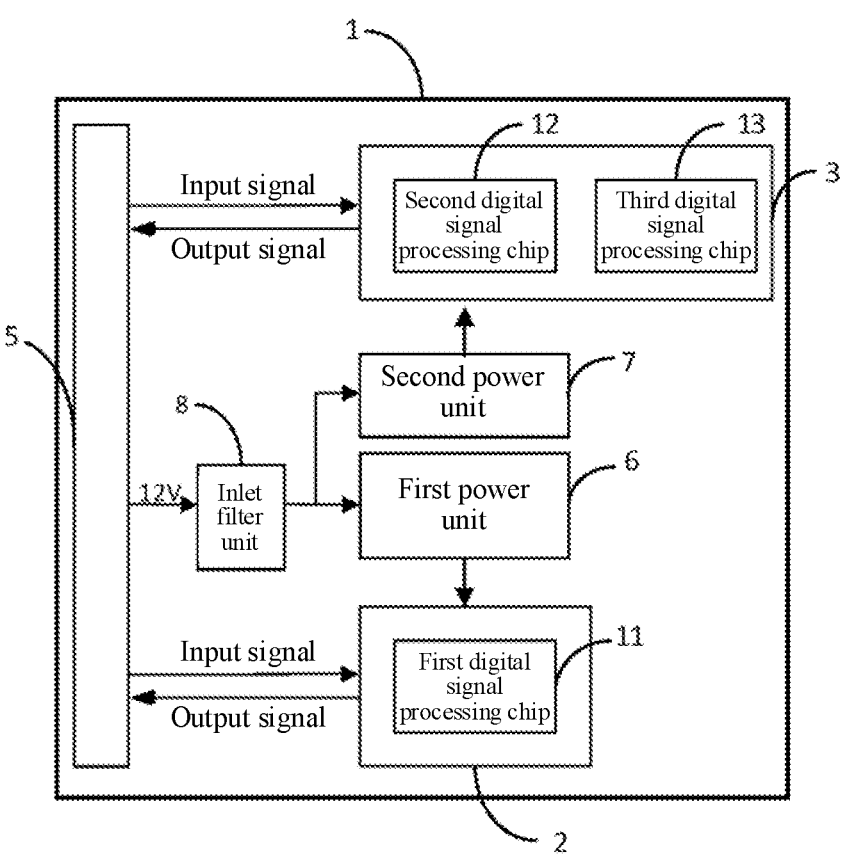
FIG. 2 is a schematic structural diagram of an integrated low-voltage connector in an integrated controller according to an embodiment of the present disclosure.

In an implementation, as shown in FIG. 2, the integrated controller 10 further includes a low-voltage connector 5.

The low-voltage connector 5 is arranged in the box 1. The low-voltage connector 5 is connected with the control unit 2 and the charging/discharging conversion unit 3 receive a low-voltage power signal and a transmission communication signal. In an embodiment, in the original low-voltage design of the vehicle, each module is provided with an independent controller, so that each module requires to be provided with a low-voltage connector separately to exchange information with external signals. However, in the embodiment of the present disclosure, all low-voltage connectors in the original low-voltage design of the vehicle are combined into one. In other words, after the motor controller, the vehicle controller, and the battery management controller are integrated into the control unit 2, and the DC conversion unit and the on-board charging unit are integrated into the charging/discharging conversion unit 3, the control unit 2 and the charging/discharging conversion unit 3 use the same low-voltage connector 5. As a result, the low-voltage power signal and the transmitted communication signal are divided into two after being inputted by the low-voltage connector 5, so as to respectively supply power and signal interactive communication for the control unit 2 and the charging/discharging conversion unit 3. Based on design, use of the low-voltage wiring harnesses and the low-voltage interfaces can be reduced, and costs can be reduced.

Figure 3:
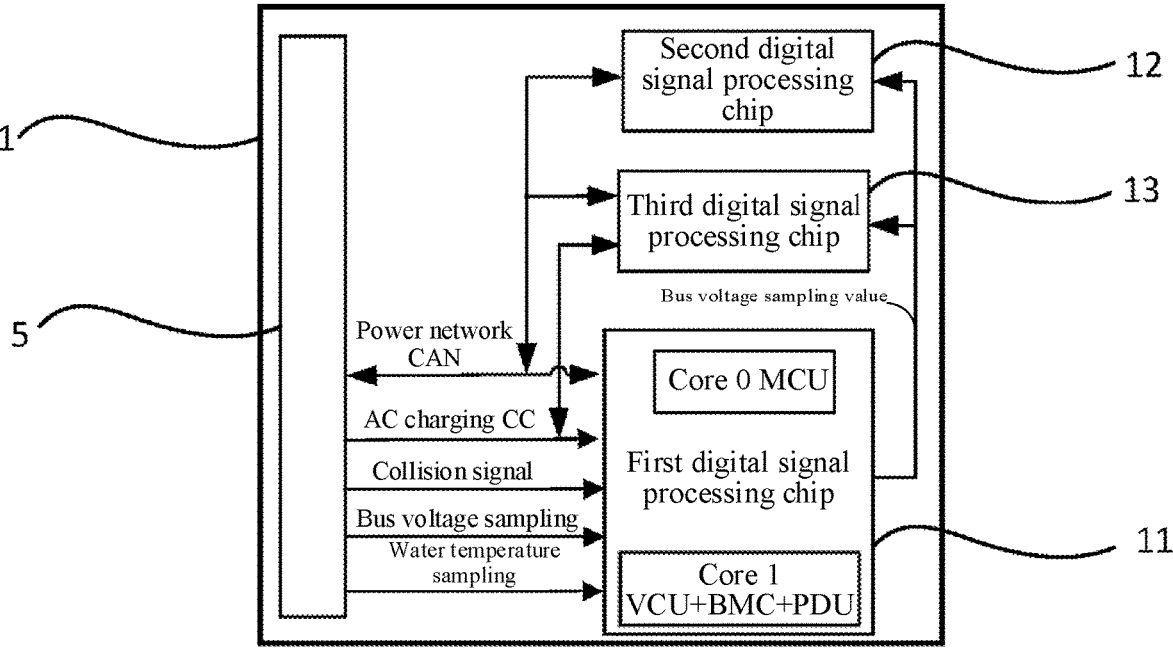
FIG. 3 is a schematic structural diagram after integrating a low-voltage signal in an integrated controller according to an embodiment of the present disclosure.

In some embodiments, as shown in FIG. 3, the motor controller, the vehicle controller, and the battery management controller are integrated in a first digital signal processing chip 11; the DC conversion unit is arranged on a second digital signal processing chip 12; and the on-board charging unit is arranged on a third digital signal processing chip 13.

In other words, in the original low-voltage design of the vehicle, each module is provided with a separate digital signal processing chip for signal acquisition and control. However, in the embodiment of the present disclosure, after the motor controller, the vehicle controller, and the battery management controller are integrated into the control unit 2, and the DC conversion unit and the on-board charging unit are integrated into the charging/discharging conversion unit 3, when the resources are satisfied, the motor controller, the vehicle controller, and the battery management controller are designed to combine and use the first digital signal processing chip 11. In this way, quantities of digital signal processing chips used may be reduced, costs may be saved, and occupied space may be reduced.

In an embodiment, as shown in FIG. 2, in the embodiment of the present disclosure, all low-voltage connectors in the original low-voltage design of the vehicle are combined, and the low-voltage power signal and the transmitted communication signal transmitted by the control unit 2 and the charging/discharging conversion unit 3 are all inputted by the interface of the same low-voltage connector 5, so that quantities of the low-voltage connectors used may be saved. In addition, on the premise that the received low-voltage power signal and the transmitted communication signal are the same, the different modules in the control unit 2 and the charging/discharging conversion unit 3 can share the same interface pin input. In other words, the embodiment of the present disclosure changes the way in which the original different modules acquire the communication signals to the same sampling channel for the same communication signal between different modules. That is to say, the same communication signal is transmitted by the same pin of the low-voltage connector 5 and transmitted to different modules, so that quantities of pins of the low-voltage connector 5 can be reduced and costs can be saved.

In the embodiment, as shown in FIG. 3, for the same transmitted communication signal externally transmitted, the low-voltage connector 5 only designs one sampling channel for signal acquisition, and sends the acquired signals to different digital signal processing chips for information processing. For example, for CAN communication of a power network, the low-voltage connector 5 is provided with a fixed connector for external connection. In other words, the power network CAN communication signal is only received by the connector. The low-voltage connector 5 divides the received power network CAN communication signal into three and respectively transmitted to the first digital signal processing chip 11, the second digital signal processing chip 12, the third digital signal processing chip 13, so that the vehicle controller, the DC conversion unit, and the on-board charging unit can simultaneously receive the CAN communication signal of the power network. For an alternating current (AC) charging CC signal, this signal is an acquisition signal provided to both the on-board charging unit and the battery management controller. After integration, the transmission of the signal is combined into a connector interface, and one acquisition channel is used. In other words, the signal only requires to be inputted through one signal of the low-voltage connector 5, and is divided into two and respectively transmitted to the on-board charging unit and the battery management controller, so that the battery management controller and the on-board charging unit perform corresponding operations based on the signal, such as status information of detecting whether a charging gun is connected. For a collision signal or a bus voltage sampling signal or a water temperature sampling signal, the signal requires to be separately transmitted to the motor controller, the vehicle controller, and the battery management controller before integration. However, after the motor controller, the vehicle controller, and the battery management controller are integrated into the first digital signal processing chip 11, the transmission of the signal can be combined by using the interface of the same low-voltage connector 5, and can be transmitted to the integrated first digital signal processing chip 11 through one acquisition channel. In this way, the vehicle controller can learn whether the vehicle has a collision based on the collision signal, learn a voltage value of the power battery based on the bus voltage sampling signal, and learn a heat dissipation situation of a heat dissipation system and control of a water pump based on the water temperature sampling signal. Therefore, unlike the design in which each module in the original vehicle uses a separate device, the present embodiment achieves the low cost, small volume, and light weight by reusing the low-voltage connector 5 and the low-voltage interface.

In an implementation, as shown in FIG. 2, the integrated controller 10 further includes a first power unit 6 and a second power unit 7.

The first power unit 6 is connected with the first digital signal processing chip 11 to convert the low-voltage power signal into a power supply signal provided to the first digital signal processing chip 11. The second power unit 7 is connected with the second digital signal processing chip 12 and the third digital signal processing chip 13 to convert the low-voltage power signal into a power supply signal provided to the second digital signal processing chip 12 and the third digital signal processing chip 13.

That is to say, different from the design in which each module is provided with a separate power in the original vehicle, as shown in FIG. 2, in the embodiment of the present disclosure, after the motor controller, the vehicle controller, and the battery management controller are integrated into the control unit 2, and the DC conversion unit and the on-board charging unit are integrated into the charging/discharging conversion unit 3, the original power supply mode for different modules is changed to a mode by reusing the same voltage power for multiple modules. In an embodiment, the low-voltage power signals are all connected from the low-voltage connector 5, and are divided into two and respectively transmitted to the first power unit 6 and the second power unit 7. The first power unit 6 converts the low-voltage power signal to the power for the first digital signal processing chip 11 to supply power to the control unit 2. The second power unit 7 converts the low-voltage power signal into the power for the second digital signal processing chip 12 and the third digital signal processing chip 13 to supply power to the charging/discharging conversion unit 3. In this way, in the embodiment of the present disclosure, by combining the plurality power modules in the original vehicle design into the first power unit 6 and the second power unit 7, demand for the power module structural components can be reduced, costs can be reduced, and volume can be reduced to save the vehicle space.

Figure 4:
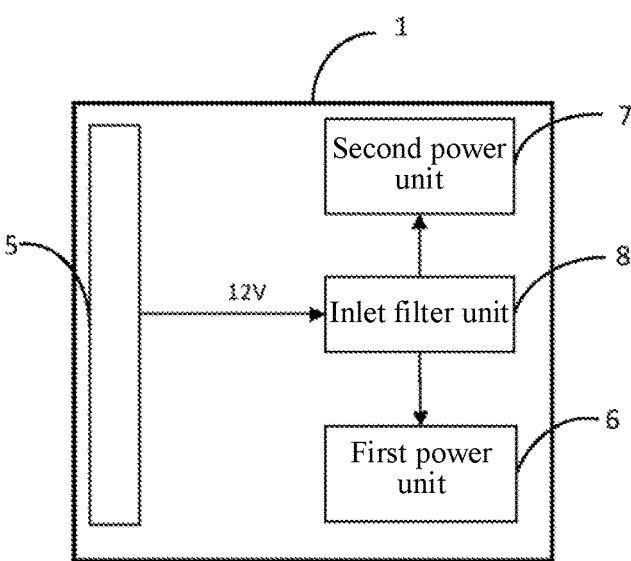
FIG. 4 is a schematic structural diagram of an integrated inlet filter unit in an integrated controller according to an embodiment of the present disclosure.

In an implementation, as shown in FIG. 2 or FIG. 4, the integrated controller 10 further includes an inlet filter unit 8.

The inlet filter unit 8 is connected with the low-voltage connector 5, the first power unit 6, and the second power unit 7 to filter the low-voltage power signal.

In an embodiment, in the original low-voltage design of the vehicle, a separate inlet filter protection circuit is provided for each module. In the embodiment of the present disclosure, the multiple inlet filter protection circuits in the original vehicle design are combined into one inlet filter unit 8, that is, each module in the integrated controller 10 shares the same inlet filter unit 8. For example, as shown in FIG. 4, the low-voltage battery power of a passenger vehicle is 12 V, and all modules on the vehicle are powered from the 12 V power supply. The low-voltage power signal enters through the low-voltage connector 5 and is uniformly inputted to the inlet filter unit 8. The inlet filter unit 8 performs inlet protection filtering processing on a low-voltage power signal, such as an inlet TVS tube, an anti-reverse diode, an inlet electrolytic capacitor, an inlet ceramic capacitor, a magnetic bead, a differential mode inductor, a common mode inductor and another circuit processing. The processed low-voltage power signal is transmitted to the first power unit 6 and the second power unit 7 to supply low-voltage power to different modules in the integrated controller 10. Based on the above, the design can not only effectively avoid inlet interference, lightning strikes, surges, and the like, but also reduce design of the inlet filter protection circuit, and saves costs and space.

In summary, according to the integrated controller 10 of the embodiment of the present disclosure, the motor controller, the vehicle controller, and the battery management controller are integrated into the control unit 2, and the DC conversion unit and the on-board charging unit are integrated into the charging/discharging conversion unit 3. As a result, arrangement of the high-voltage distribution box may be canceled, demand for the high-voltage connection members and the high-voltage wiring harnesses can be reduced, and the same box 1 may be shared, design of the module housing and the related support frames can be reduced, and the low-voltage connectors 5 may be shared, saving the low voltage wiring harness and the low voltage interface. In addition, the power unit and the acquisition channel can be reused between different modules by using the same power and acquiring the same signal, and the power module and the signal wiring harness are not required to design separately.

Figures 5, 6:
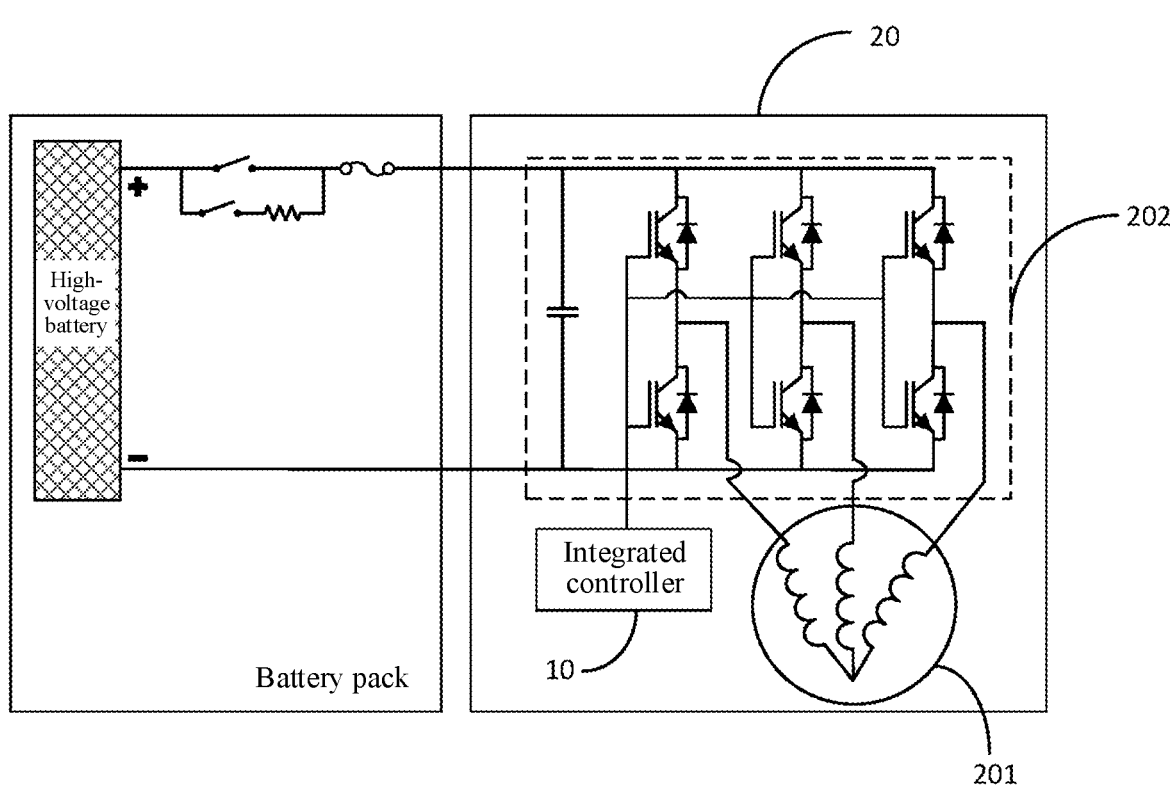
FIG. 5 is a schematic structural diagram of an electric drive assembly according to an embodiment of the present disclosure.
FIG. 6 is a schematic structural diagram of a vehicle according to an embodiment of the present disclosure.

A second aspect of an embodiment of the present disclosure provides an electric drive assembly. As shown in FIG. 5, the electric drive assembly 20 includes an integrated controller 20 provided by the embodiments, a motor 201, and a motor drive module 202 (e.g., a motor driver).

The integrated controller 20 is configured to send a heating control signal when it is determined that a vehicle has a heating demand; and the motor drive module 202 is connected with the integrated controller 20 and the motor 201 to drive the motor to generate heat in response to the heating control signal. In other words, the embodiment of the present disclosure uses the integrated controller 10 integrated in the above embodiment, and shares the motor 201 and the motor drive module 202 for each module in the integrated controller 10, so as to realize the function of heating the battery in a low temperature environment, and a heating module is not required to separately design for heating the battery, and costs of the vehicle are further saved.

In an embodiment, as shown in FIG. 5, the heating of the high-voltage battery in the embodiment of the present disclosure directly reuses the integrated controller 10 and the motor drive module 202 of the electric drive assembly 20. The integrated controller 10 outputs a proportion of a reactive current or outputs all the reactive current during locked-rotor heating, so that the motor drive module 202 and the motor winding are heated, so that in a low temperature environment, a water temperature rises, and the high-voltage battery is heated by a water circulation system of the vehicle.

Referring to FIG. 5, the electric drive assembly 20 is mainly divided into the following three operating conditions.

The electric drive assembly 20 is in a normal drive mode, and the integrated controller 10 outputs id=0 and iq=Imax during software control, so as to ensure a maximum output torque at a shaft end to drive the vehicle to normally travel. In the low temperature environment, in order to ensure good performance of the battery, the battery requires to be heated. That is to say, the battery is heated by reusing the motor drive module 202, heat is generated by using the motor 201, and the battery is heated through a thermal circulation system. Heating by using the motor drive module 202 is divided into two modes: heating while traveling and locked-rotor heating. The traveling heating is usually performed under medium and small torques. The integrated controller 10 controls id to increase and iq to decrease, so as to increase the total current and realize heating while ensuring the same output torque at the shaft end. The locked-rotor heating is in a case of parking. The integrated controller 10 controls id=Imax, and iq=0, so as to ensure that the output torque of the shaft end is 0, and the motor is heated by three-phase DC heating.

According to the electric drive assembly 20 in the embodiment of the present disclosure, the motor drive module 202 is controlled by the motor controller through the integrated controller 10, and the function of heating the battery in a low temperature environment can be realized by using heating while traveling and locked-rotor heating. The heating module is not required to separately design for heating the battery, and costs of the vehicle are further saved.

In some embodiments, the electric drive assembly 20 also includes a speed reducer. The speed reducer is connected with the integrated controller 10. That is to say, structurally, the same motor 201 and the same speed reducer are used for different modules in the integrated controller 10, so that use of structural parts can be reduced, costs of the vehicle can be reduced, assembly volume can be reduced, and weight can be reduced through structural reuse.

A third aspect of the present disclosure provides a vehicle. The vehicle in the embodiment of the present disclosure is described below.

In an embodiment of the present disclosure, the vehicle 30 includes a power battery 301 and an integrated controller 10 provided by the embodiment, and the power battery 301 is connected with the integrated controller 10.

In this embodiment, an implementation of the vehicle 30 is similar to an implementation of the integrated controller 10 of any of the embodiments of the present disclosure. For details, refer to the descriptions of the integrated controller 10. In order to reduce redundancy, details are not described herein again.

In another embodiment of the present disclosure, as shown in FIG. 6, the vehicle 30 includes a power battery 301 and the electric drive assembly 20 provided by the embodiment.

In an embodiment, the AC charging port passes through a power factor correction (PFC) circuit, to realize a bidirectional conversion function of converting 220 V AC to DC or converting DC to AC. In addition, a primary side of a transformer of the on-board charging unit is shared, and one more winding is added to s secondary side. In this way, an output function of the DC conversion unit can be realized at the same time.

The charging manners for the vehicle 30 are divided into DC charging and AC charging. During the DC charging, the current flows to the power battery 301 from a charging pile through a power distribution part of the electric drive assembly 20 to charge the power battery 301. During the AC charging, the current is converted from 220 V household electricity to the power battery 301 for charging by the on-board charging unit in the electric drive assembly 20. When the vehicle 30 is normally driven, the current flows from the power battery 301 to the motor through the motor controller in the electric drive assembly 20 to drive the vehicle 30 to operate normally. Heating is divided into heating while traveling and locked-rotor heating. The heating while traveling means that during normal driving of the vehicle 30, the motor controller controls, through a PWM wave, a part of the current to output useful work to drive the vehicle 30 to travel and a part of the current to output useless work, and the current flows through the motor controller and the motor, so that a coil of the motor generates heat, to heat a coolant and finally heat the power battery 301.

According to the vehicle 30 in the embodiment of the present disclosure, by using the integrated controller 10 or the electric drive assembly 20 provided by the embodiment, the vehicle integration and the reuse degree can be improved, costs of the vehicle can be reduced, and the vehicle space can be saved.

In the description of this specification, the description of the reference terms such as "an embodiment", "some embodiments", "exemplary embodiments", "example", "specific example", or "some examples" means that the features, structures, materials, or characteristics described with reference to the embodiment or example are included in at least one embodiment or example of the present disclosure. In the present disclosure, descriptions of the foregoing terms do not necessarily refer to the same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

REFERENCE NUMERALS

Integrated controller 10; Electric drive assembly 20; Vehicle 30;

Box 1; Control unit 2; Charging/discharging conversion
unit 3; High-voltage interface assembly 4; Low-voltage
connector 5; First power unit 6; Second power unit 7;
Inlet filter unit 8;
First digital signal processing chip 11; Second digital
signal processing chip 12; Third digital signal process-
ing chip 13;
First high-voltage interface 41; Second high-voltage inter-
face 42; Third high-voltage interface 43;
Motor 201; Motor drive module 202; and Power battery
301.
What is claimed is:

1. An integrated controller, comprising:
a box;
a controller and a charging/discharging converter dis-
posed in the box;
a high-voltage interface assembly, comprising a high-
voltage interface disposed on the box and a high-
voltage connector disposed in the box, the high-voltage
connector connected with the high-voltage interface,
the controller, and the charging/discharging converter
to receive and distribute a high-voltage battery signal,
and the high-voltage interface assembly comprising a
first high-voltage interface, a second high-voltage inter-
face, and a third high-voltage interface disposed on the
box, a first connector, a second connector, a third
connector, and a fourth connector, wherein:
the first high-voltage interface is configured to receive
the high-voltage battery signal; the first connector is
connected with the first high-voltage interface and
the second high-voltage interface; the second con-
nector is connected with the first high-voltage inter-
face and an on-board charger of the charging/dis-
charging converter; the third connector is connected
with an motor controller of the controller; and the
fourth connector is connected with the first high-
voltage interface and the third high-voltage inter-
face; and
a low-voltage connector disposed in the box, and con-
nected with the controller and the charging/discharging
converter to receive a low-voltage power signal and a
transmission communication signal.

2. The integrated controller according to claim 1, wherein
the controller further comprises a vehicle controller and a
battery management controller; and the charging/discharg-
ing converter further comprises a direct current (DC) con-
verter.

3. The integrated controller according to claim 2, wherein
the motor controller, the vehicle controller, and the battery
management controller are integrated in a first digital
signal processing chip;
the DC converter is disposed on a second digital signal
processing chip; and
the on-board charger is disposed on a third digital signal
processing chip.

4. The integrated controller according to claim 3, further
comprising:
a first power unit, connected with the first digital signal
processing chip to convert the low-voltage power sig-
nal into a first power supply signal provided to the first
digital signal processing chip; and
a second power unit, connected with the second digital
signal processing chip and the third digital signal
processing chip to convert the low-voltage power sig-
nal into a second power supply signal provided to the
second digital signal processing chip and the third
digital signal processing chip.

5. The integrated controller according to claim 4, further
comprising:
an inlet filter connected with the low-voltage connector,
the first power unit, and the second power unit to filter
the low-voltage power signal.

6. An electric drive assembly, comprising:
an integrated controller, configured to send a heating
control signal in response to a heating demand of a
vehicle; and
a motor and a motor driver, the motor driver connected
with the integrated controller and the motor to drive the
motor to generate heat in response to the heating
control signal; wherein
the integrated controller comprises:
a box;
a controller and a charging/discharging converter dis-
posed in the box;
a high-voltage interface assembly, comprising a high-
voltage interface disposed on the box and a high-
voltage connector disposed in the box, the high-voltage
connector connected with the high-voltage interface,
the controller, and the charging/discharging converter
to receive and distribute a high-voltage battery signal,
and the high-voltage interface assembly comprising a
first high-voltage interface, a second high-voltage inter-
face, and a third high-voltage interface disposed on the
box, a first connector, a second connector, a third
connector, and a fourth connector, wherein:
the first high-voltage interface is configured to receive
the high-voltage battery signal; the first connector is
connected with the first high-voltage interface and
the second high-voltage interface; the second con-
nector is connected with the first high-voltage inter-
face and an on-board charger of the charging/dis-
charging converter; the third connector is connected
with a motor controller of the controller; and the
fourth connector is connected with the first high-
voltage interface and the third high-voltage inter-
face; and
a low-voltage connector disposed in the box, and con-
nected with the controller and the charging/discharging
converter to receive a low-voltage power signal and a
transmission communication signal.

7. The electric drive assembly according to claim 6,
further comprising a speed reducer connected with the
integrated controller.

8. The electric drive assembly according to claim 6,
wherein the controller further comprises a vehicle controller
and a battery management controller; and the charging/
discharging converter further comprises a direct current
(DC) converter.

9. The electric drive assembly according to claim 8,
wherein
the motor controller, the vehicle controller, and the battery
management controller are integrated in a first digital
signal processing chip;
the DC converter is disposed on a second digital signal
processing chip; and
the on-board charger is disposed on a third digital signal
processing chip.

10. The electric drive assembly according to claim 9,
wherein the integrated controller comprises:
a first power unit, connected with the first digital signal
processing chip to convert the low-voltage power sig-
nal into a first power supply signal provided to the first
digital signal processing chip; and a second power unit, connected with the second digital signal processing chip and the third digital signal processing chip to convert the low-voltage power signal into a second power supply signal provided to the second digital signal processing chip and the third digital signal processing chip.

11. The electric drive assembly according to claim 10, wherein the integrated controller comprises:

an inlet filter connected with the low-voltage connector, the first power unit, and the second power unit to filter the low-voltage power signal.

12. A vehicle, comprising a power battery and an electric drive assembly, wherein the electric drive assembly comprises:

an integrated controller, configured to send a heating control signal in response to a heating demand of the vehicle; and a motor and a motor driver, the motor driver connected with the integrated controller and the motor to drive the motor to generate heat in response to the heating control signal; wherein the integrated controller comprises:

a box;

a controller and a charging/discharging converter disposed in the box;

a high-voltage interface assembly, comprising a high-voltage interface disposed on the box and a high-voltage connector disposed in the box, the high-voltage connector connected with the high-voltage interface, the controller, and the charging/discharging converter to receive and distribute a high-voltage battery signal, and the high-voltage interface assembly comprising a first high-voltage interface, a second high-voltage interface, and a third high-voltage interface disposed on the box, a first connector, a second connector, a third connector, and a fourth connector, wherein:

the first high-voltage interface is configured to receive the high-voltage battery signal; the first connector is connected with the first high-voltage interface and the second high-voltage interface; the second connector is connected with the first high-voltage interface and an on-board charger of the charging/discharging converter; the third connector is connected with a motor controller of the controller; and the fourth connector is connected with the first high-voltage interface and the third high-voltage interface; and a low-voltage connector disposed in the box, and connected with the controller and the charging/discharging converter to receive a low-voltage power signal and a transmission communication signal.

13. The vehicle according to claim 12, wherein the electric drive assembly comprises a speed reducer connected with the integrated controller.

14. The vehicle according to claim 12, wherein the controller further comprises a vehicle controller and a battery management controller; and the charging/discharging converter further comprises a direct current (DC) converter.

15. The vehicle according to claim 14, wherein the motor controller, the vehicle controller, and the battery management controller are integrated in a first digital signal processing chip;

the DC converter is disposed on a second digital signal processing chip; and the on-board charger is disposed on a third digital signal processing chip.

16. The vehicle according to claim 15, wherein the integrated controller comprises:

a first power unit, connected with the first digital signal processing chip to convert the low-voltage power signal into a first power supply signal provided to the first digital signal processing chip; and a second power unit, connected with the second digital signal processing chip and the third digital signal processing chip to convert the low-voltage power signal into a second power supply signal provided to the second digital signal processing chip and the third digital signal processing chip.

17. The vehicle according to claim 16, wherein the integrated controller comprises:

an inlet filter connected with the low-voltage connector, the first power unit, and the second power unit to filter the low-voltage power signal.

* * * * *